(12) United States Patent
Momosaki et al.

(10) Patent No.: US 8,006,488 B2
(45) Date of Patent: Aug. 30, 2011

(54) EXHAUST SYSTEM FOR MOTORCYCLE

(75) Inventors: Makoto Momosaki, Kakogawa (JP); Hisatoyo Arima, Akashi (JP)

(73) Assignee: Kawasaki Jukogyo Kabushiki Kaisha, Kobe-Shi (JP)

( * ) Notice: Subject to any disclaimer, the term of this patent is extended or adjusted under 35 U.S.C. 154(b) by 744 days.

(21) Appl. No.: 10/934,380

(22) Filed: Sep. 7, 2004

(65) Prior Publication Data

US 2005/0056010 A1    Mar. 17, 2005

(30) Foreign Application Priority Data

Sep. 11, 2003  (JP) ................................. 2003-320069

(51) Int. Cl.
*F01N 1/00* (2006.01)
(52) U.S. Cl. ................. 60/324; 60/292; 60/313; 60/323
(58) Field of Classification Search ............... 60/324, 60/313, 292, 312, 314, 323
See application file for complete search history.

(56) References Cited

U.S. PATENT DOCUMENTS

| | | | | |
|---|---|---|---|---|
| 1,990,837 A | * | 2/1935 | Morgenstern | 181/255 |
| 2,239,262 A | * | 4/1941 | Violet | 60/273 |
| 4,785,626 A | * | 11/1988 | Shiraishi | 60/313 |
| 4,795,420 A | * | 1/1989 | Sakurai et al. | 60/313 |
| 4,909,033 A | * | 3/1990 | Ueda | 60/313 |
| 4,999,999 A | * | 3/1991 | Takahashi et al. | 60/313 |
| 5,144,799 A | * | 9/1992 | Barth | 60/313 |
| 6,761,239 B2 | * | 7/2004 | Kawamoto | 180/219 |

FOREIGN PATENT DOCUMENTS

| | | |
|---|---|---|
| JP | A 63-16127 | 1/1988 |
| JP | A-63-208611 | 8/1988 |
| JP | A-63-255515 | 10/1988 |
| JP | A-02-162185 | 6/1990 |
| JP | A 2002-138828 | 5/2002 |
| JP | A-2002-138828 | 5/2002 |

\* cited by examiner

*Primary Examiner* — Binh Q Tran
(74) *Attorney, Agent, or Firm* — Oliff & Berridge, PLC (57) ABSTRACT

An exhaust system for a motorcycle provided with a multi-cylinder engine, includes an exhaust aggregating member for unifying a pair of exhaust passages, through which an exhaust gas exhausted from the engine is transported to a muffler, so as to form a single exhaust passage therein. The single exhaust passage is connected to the muffler without being merged with another exhaust passage. The exhaust system also includes an exhaust control valve incorporated into the exhaust aggregating member and capable of changing sectional area of the single exhaust passage formed in the exhaust aggregating member.

15 Claims, 7 Drawing Sheets

EXHAUST SYSTEM FOR MOTORCYCLE

BACKGROUND OF THE INVENTION

1. Field of the Invention

The present invention relates to an exhaust system for a motorcycle and, more particularly, to an exhaust system for a motorcycle provided with a multicylinder engine.

2. Description of the Related Art

Figure 8:
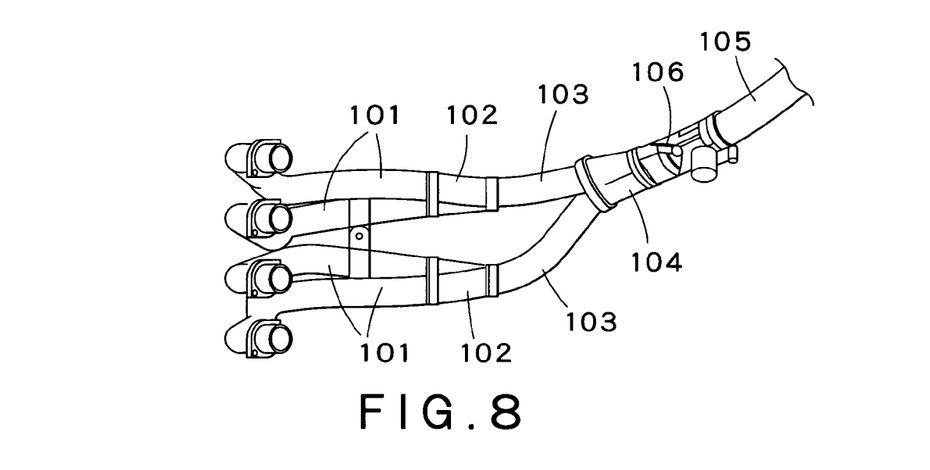
FIG. 8 is a plan view of an exhaust system of a related art.

FIG. 8 shows an exhaust system, which is disclosed in JP-A 2002-138828, for a motorcycle provided with a four-cylinder engine. As shown in FIG. 8, the exhaust system is formed by connecting four upstream exhaust pipes 101 connected to the exhaust ports of the four cylinders to two exhaust aggregating members 102, connecting the two exhaust aggregating members 102 to two intermediate exhaust pipes 103, connecting the two intermediate exhaust pipes 103 to a downstream exhaust aggregating member 104, connecting the downstream exhaust aggregating member to a downstream exhaust pipe 105, and connecting the downstream exhaust pipe 105 to a single exhaust muffler. The exhaust system is provided with an exhaust control valve 106 to improve the output characteristic of the engine and to reduce exhaust noise. In some exhaust system, adjacent exhaust pipes are connected by a connecting pipe. The exhaust control valve 106 is capable of changing the sectional area of an exhaust passage of the exhaust system. The exhaust control valve 106 changes the sectional area of the exhaust passage according to the change of the operating condition of the engine, such as the change of the load on the engine, change of fuel injection rate, the change of running speed or the change of engine speed to improve the output characteristic of the engine and to reduce exhaust noise.

In some cases, the exhaust control valve 106 is incorporated into each of the exhaust aggregating members 102 which are connected to the four upstream exhaust pipes 101. In the exhaust system shown in FIG. 8, the exhaust control valve 106 is incorporated into the downstream exhaust pipe 105 which is positioned on the downstream side with respect to the downstream exhaust aggregating member 104.

Figure 9:
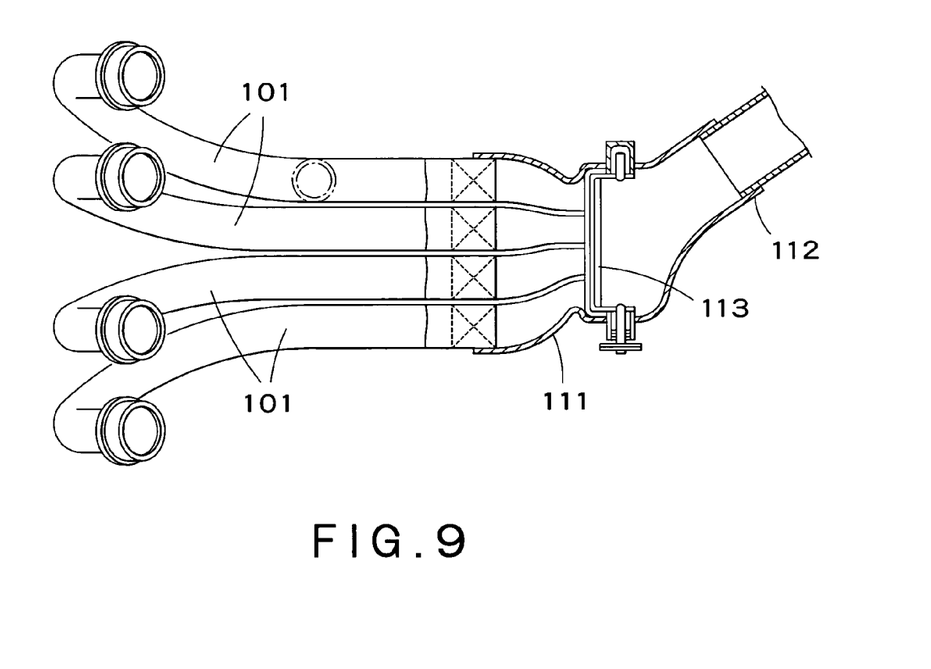
FIG. 9 is a plan view of another exhaust system of a related art.

FIG. 9 shows an exhaust system, which is disclosed in JP-A 63-16127, for a motorcycle provided with a four-cylinder engine. As shown in FIG. 9, this exhaust system is formed by connecting four exhaust pipes 101 connected to the exhaust ports of the cylinders to a single exhaust aggregating member 111, connecting the exhaust aggregating member 111 to a single exhaust pipe 112, and incorporating an exhaust control valve 113 into the exhaust aggregating member 111.

Figure 10:
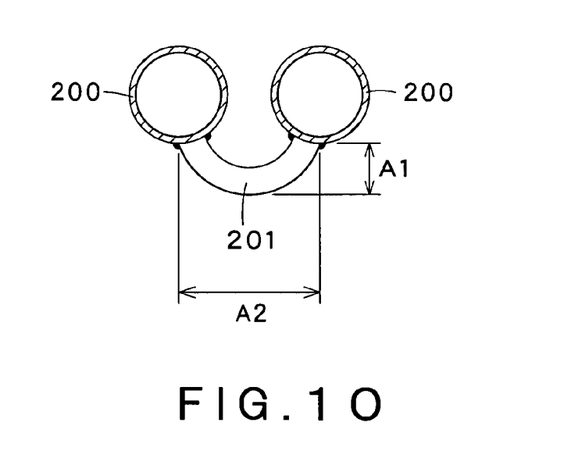
FIG. 10 is a sectional view of an exhaust pipe connecting structure in an exhaust system of a related art.

Moreover, in an exhaust system of a related art, as shown in FIG. 10, exhaust passages in two adjacent exhaust pipes 200 of the exhaust system are connected by a connecting pipe 201 having the shape of a circular arc and joined to the adjacent exhaust pipes 200 by welding.

In the exhaust system shown in FIG. 8, an exhaust passage between the exhaust port of the engine and the exhaust control valve 106 becomes inevitably long. Consequently, the response of the exhaust control valve 106 to the change of the operating condition of the engine is delayed, and hence the exhaust control valve 106 is unable to contribute effectively to the improvement of the output characteristic of the engine.

Since the exhaust system shown in FIG. 9 has the four exhaust pipes 101 connected to the single exhaust aggregating member 111, the exhaust aggregating member 111 becomes inevitably large, thereby the exhaust control valve 113 becomes large and has complicated construction inevitably. The large exhaust control valve 113 places restrictions on the layout of the exhaust system and increases the cost of the exhaust system.

When the connecting pipe 201 having the shape of a circular arc is joined to the two adjacent exhaust pipes 200 to connect the exhaust passages in the two adjacent exhaust pipes 200 as shown in FIG. 10, the two adjacent exhaust pipes 200 must be spaced a fixed distance apart to prevent the collision of the exhaust pipes 200 against each other when shocks are exerted thereon. Further, a space of A1×A2 is necessary to install the arc shaped connecting pipe 201, which places a restriction on the layout of the exhaust system.

SUMMARY OF THE INVENTION

Accordingly, it is an object of the present invention to provide an exhaust system for a motorcycle, provided with a simple, lightweight exhaust control valve, needing only a small space for installing the exhaust control valve, and capable of improving engine output.

According to a first aspect of the present invention, an exhaust system for a motorcycle provided with a multicylinder engine, comprises: an exhaust aggregating member for unifying a pair of exhaust passages, through which an exhaust gas exhausted from the engine is transported to a muffler, so as to form a single exhaust passage therein, the single exhaust passage being connected to the muffler without being merged with another exhaust passage; and an exhaust control valve incorporated into the exhaust aggregating member and capable of changing sectional area of the single exhaust passage formed in the exhaust aggregating member.

Preferably, the exhaust aggregating member is integrally provided with an exhaust control valve mounting part on which the exhaust control valve is mounted and an exhaust system attaching part for connecting the exhaust system to a frame of the motorcycle.

The exhaust system further comprises a common partition wall disposed at an upstream side with respect to the exhaust aggregating member so as to separate the pair of exhaust passages from each other, the common partition wall being provided with a connecting opening so that the pair of exhaust passages communicate with each other through the connecting opening.

The exhaust system further comprises: a pair of exhaust pipes defining the pair of exhaust passages; and an intermediate connecting unit connecting the pair of exhaust pipes and the exhaust aggregating member, the intermediate connecting unit being provided with the common partition wall therein.

Preferably, the connecting opening is positioned near the exhaust aggregating member.

According to a second aspect of the present invention, an exhaust system for a motorcycle provided with a multicylinder engine, comprises: an exhaust passage member configured to form a pair of exhaust passages through which an exhaust gas exhausted from the engine is transported to a muffler; and a common partition wall separating the pair of exhaust passages from each other, the common partition wall being provided with a connecting opening so that the pair of exhaust passages communicate with each other through the connecting opening.

Preferably, the exhaust passage member comprises: a pair of exhaust pipes defining the pair of exhaust passages; and an intermediate connecting unit connect to a downstream end of the pair of exhaust pipes, the intermediate connecting unit being provided with the common partition wall therein.

Preferably, the connecting opening is positioned near an exhaust aggregating member configured to unify the pair of exhaust passages so as to form a single exhaust passage therein, the exhaust aggregating member being positioned at a downstream side with respect to the connecting opening.

According to the present invention, by incorporating the exhaust control valve into the exhaust aggregating member unifying a pair of exhaust passages so as to form therein a single exhaust passage which is connected to a muffler without being merged with another exhaust passage, the exhaust control valve can have simple, lightweight, and compact construction. Therefore, the exhaust system can be easily arranged and manufactured at a low cost. The exhaust system can improve the output characteristic of the engine with simple construction.

According to the present invention, by integrally providing the exhaust aggregating member with the exhaust control valve mounting part, such as bosses for supporting a valve shaft and a support lug for supporting a control wire, and the exhaust system attaching part, such as an attaching lug, the manufacturing and assembling works of the exhaust system can be facilitated.

According to the present invention, by forming the connecting opening in the common partition wall separating the pair of exhaust passages from each other so that the pair of exhaust passages communicate with each other through the connecting opening, the exhaust system does not need any space for installing a member corresponding to the connecting pipe having the shape of a circular arc of the exhaust system shown in FIG. 10, any space does not need to be secured between the pair of exhaust pipes, and hence the exhaust system can have compact construction.

According to the present invention, by using the intermediate connecting unit connecting the pair of exhaust pipes and the exhaust aggregating member and being provided with the common partition wall therein, the manufacturing and assembling works of the exhaust system can be facilitated.

According to the present invention, by positioning the connecting opening near the exhaust aggregating member and at the upstream side with respect to the exhaust aggregating member, pressures and flow rates of exhaust gas in the exhaust passages can be equalized before the exhaust gas flows into the exhaust aggregating member. Consequently, the exhaust gas is not disturbed in the exhaust aggregating member and is able to flow smoothly through the exhaust aggregating member.

DESCRIPTION OF THE PREFERRED EMBODIMENTS

An exhaust system in a first embodiment according to the present invention for a motorcycle will be described with reference to FIGS. 1 to 3.

Figure 1:
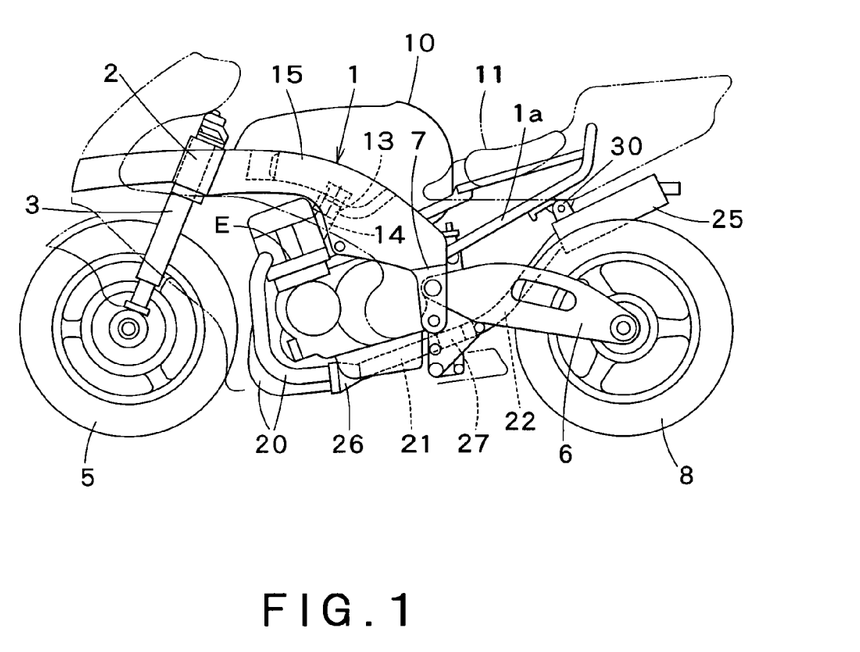
FIG. 1 is a side elevation of a motorcycle provided with an exhaust system according to the present invention, showing the left side of the motorcycle.

Referring to FIG. 1 showing a motorcycle in a side elevation, the motorcycle has a body structure including a main frame 1 and a rear frame 1a. A head pipe 2 joined to the front end of the main frame 1 supports a front fork 3. The front fork 3 supports a front wheel 5 on its lower end. A swing arm 6 is supported on lower brackets 7 joined to the rear end of the main frame 1. The swing arm 6 supports a rear wheel 8 on its rear end. A fuel tank 10 and a seat 11 are mounted on the body structure. A four-cylinder engine E, such as a parallel-cylinder engine, is suspended from the main frame 1. The engine E is attached to the main frame 1 and the lower brackets 7 with bolts. An intake pipe 14 provided with a carburetor 13 has one end connected to intake ports formed in the rear wall of a cylinder head and the other end connected to an air cleaner 15 disposed under the fuel tank 10.

Four exhaust ports for four cylinders are formed in the front wall of the cylinder head of the engine E. The exhaust system is connected to the exhaust ports. The exhaust system includes exhaust pipes, exhaust aggregating members, and an exhaust muffler 25.

Figure 2:
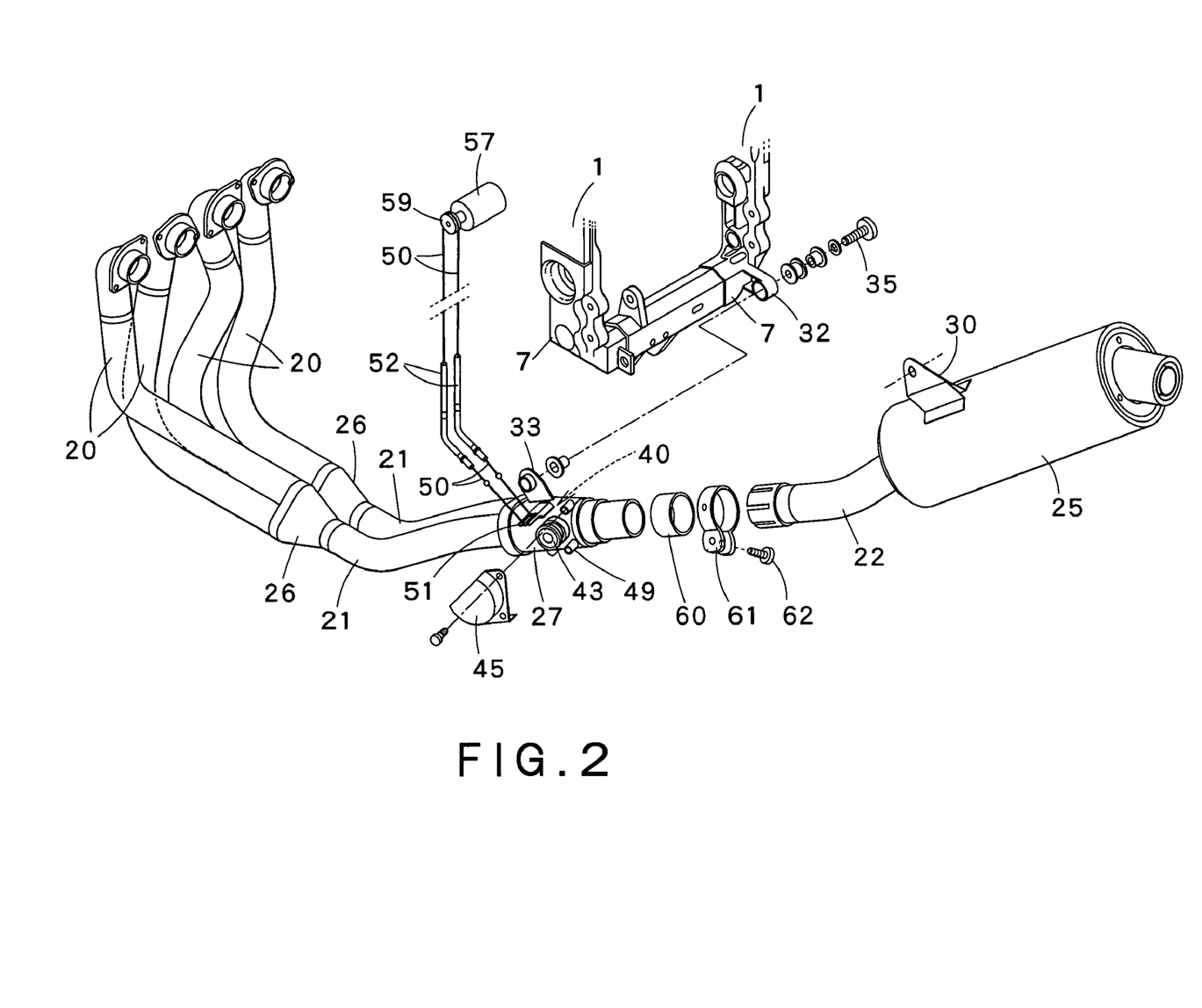
FIG. 2 is a partly exploded perspective view of an exhaust system in a first embodiment according to the present invention.

Referring to FIG. 2 showing the exhaust system in a partly exploded perspective view, the exhaust pipes are four upstream exhaust pipes 20 connected to the exhaust ports of the engine E, a downstream exhaust pipe 22 connected to the exhaust muffler 25, and two intermediate exhaust pipes 21. The exhaust aggregating members are two first exhaust aggregating members 26 each connecting the two upstream exhaust pipes 20 to the intermediate exhaust pipe 21, and a second exhaust aggregating member 27 connecting the two intermediate exhaust pipes 21 to the downstream exhaust pipe 22. The second exhaust aggregating member 27 unifies a pair of exhaust passages formed in the two intermediate exhaust pipes 21 so as to form a single exhaust passage therein. The single exhaust passage formed in the second exhaust aggregating member 27 is connected to the muffler 25 via the downstream exhaust pipe 22 without being merged with another exhaust passage.

The upstream exhaust pipes 20 extend downward in front of the engine E and rearward under the engine E and are connected to the two intermediate exhaust pipes 21 by the two first exhaust aggregating members 26 under the engine E. The two intermediate exhaust pipes 21 extend obliquely rightward and rearward. The two intermediate exhaust pipes 21 are connected to the downstream exhaust pipe 22 by the second exhaust aggregating member 27 at a position near the right end of the lower bracket 7. The downstream exhaust pipe 22 extends obliquely upward and rearward and is connected to the exhaust muffler 25.

The exhaust muffler 25 is provided with a support lug 30 fastened to the body structure of the motorcycle to support the muffler 25 on the body structure.

The second exhaust aggregating member 27 is formed by, for example, a casting, and is integrally provided with a support lug 33 for supporting the second exhaust aggregating member 27 on the body structure. The support lug 33 is fastened to a bracket 32 formed on the lower bracket 7 with a bolt 35.

Figure 3:
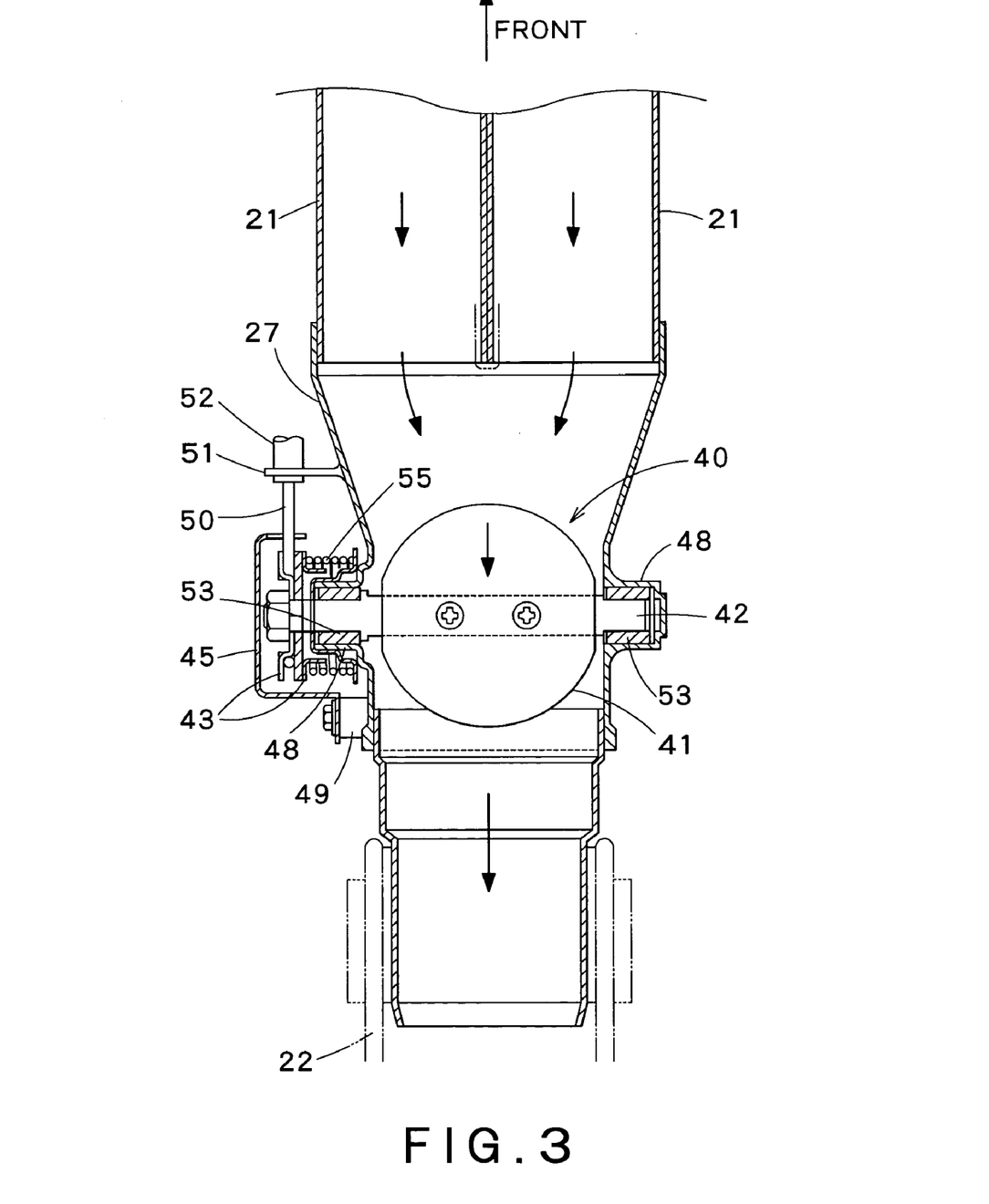
FIG. 3 is an enlarged sectional view taken in a horizontal plane of a second exhaust aggregating member shown in FIG. 2.

Referring to FIG. 3 showing the second exhaust aggregating member 27 in an enlarged, horizontal sectional view, an exhaust valve 40 is incorporated into the second exhaust aggregating member 27 at a position near the juncture of two exhaust gas streams. The exhaust control valve 40 is capable of changing the sectional area of an exhaust passage defined by the second exhaust aggregating member 27. The exhaust control valve 40 is a butterfly valve having a disk-shaped valve element 41, a valve shaft 42 fastened to the valve element 41, a drive pulley 43 fixedly mounted on the valve shaft 42, and a pulley cover 45 covering the drive pulley 43. The cast second exhaust aggregating member 27 is integrally provided on its outer surface with bosses 48 supporting the valve shaft 42, a boss 49 fixedly holding the pulley cover 45, and a support bracket 51 for supporting a valve control cable 50.

The bosses 48 supporting the valve shaft 42 are formed coaxially with each other at diametrically opposite positions on the second exhaust aggregating member 27. One of the bosses 48 is bottomed and the other is provided with an axial through hole. The valve element 41 is disposed in the single exhaust passage in the second exhaust aggregating member 27. Opposite end parts of the valve shaft 42 are supported for turning in sliding bearings 53 fitted in the bosses 48. One end part of the valve shaft 42 projects outside and the drive pulley 43 is fixedly mounted on the same end part of the valve shaft 42.

A return coil spring 55 is engaged with the drive pulley 43 to urge the valve element 41 through the drive pulley 43 and the valve shaft 42 toward an initial position to set the exhaust control valve 40 at an initial valve opening angle. The initial position of the valve element 41 may be optionally determined according to the type of the engine E. For example, the initial position may be a full open position, and the drive pulley 43 may be turned against the resilience of the return coil spring 55 to set the exhaust control valve 40 at a desired valve opening angle.

The valve control cable 50 is passed through cable sheaths 52 held by the bracket 51, and is extended between the drive pulley 43 and a pulley 59 mounted on the output shaft of a stepping motor 57 as shown in FIG. 2. The stepping motor 57 drives the drive pulley 43 for turning through the pulley 59 and the valve control cable 50.

The stepping motor 57 is controlled to regulate the valve opening angle of the exhaust control valve 40 by a controller, not shown, according to operating conditions. The controller receives signals indicating operating conditions from sensors, not shown, including an engine speed sensor, a vehicle speed sensor, a fuel injection rate sensor and an accelerator stroke sensor. For example, the exhaust control valve 40 is opened slightly to improve the output characteristic of the engine E and to reduce exhaust noise when an engine speed measured by the engine speed sensor is low, and the exhaust control valve 40 is opened at a large opening angle to reduce exhaust back pressure and to increase the output of the engine E when the engine speed is high.

The second exhaust aggregating member 27 has an upstream end welded to the intermediate exhaust pipes 21 and a downstream end detachably connected to the downstream exhaust pipe 22 with a tubular packing 60 and a fastening band 61 as shown in FIG. 2.

Referring to FIG. 2, the exhaust system is attached to the body structure and the engine E by connecting the upstream ends of the four upstream exhaust pipes 20 to the exhaust ports of the engine E, fastening the support lug 30 of the exhaust muffler 25 to a bracket attached to the rear frame 1a, and fastening the support lug 33 of the second exhaust aggregating member 27 to the boss 32 of the lower bracket 7.

Referring to FIG. 1, the exhaust gas discharged through the exhaust ports of the engine E flows through the four upstream exhaust pipes 20, the two first exhaust aggregating members 26, the two intermediate exhaust pipes 21, the second exhaust aggregating member 27 and the downstream exhaust pipe 22 into the exhaust muffler 25. The exhaust gas is emitted outside from the exhaust muffler 25.

The stepping motor 57 operates according to operating conditions, such as engine speed and vehicle speed, to regulate the valve opening angle of the exhaust control valve 40 contained in the second exhaust aggregating member 27. Consequently, the flow of the exhaust gas is controlled so that the engine E may exercise its best engine characteristic.

Since the exhaust control valve 40 is contained in the second exhaust aggregating member 27, the exhaust control valve 40 can be simple, compact and lightweight. Therefore, the exhaust system can be easily arranged, the length of the exhaust passage is not excessively long, and the engine is able to exercise its desired engine characteristic. Since the support lug 33 is formed integrally with the second exhaust aggregating member 27, the exhaust system can be easily manufactured.

An exhaust system in a second embodiment according to the present invention will be described with reference to FIGS. 4 to 7, in which parts like or corresponding to those shown in FIGS. 1 to 3 are denoted by the same reference characters and the description thereof will be omitted. The exhaust system in the second embodiment is similar in construction to the exhaust system in the first embodiment, except that the exhaust system in the second embodiment is provided, in addition to members shown in FIGS. 1 to 3, an intermediate connecting unit 71 interposed between a second exhaust aggregating member 27 and intermediate exhaust pipes 21.

Figure 4:
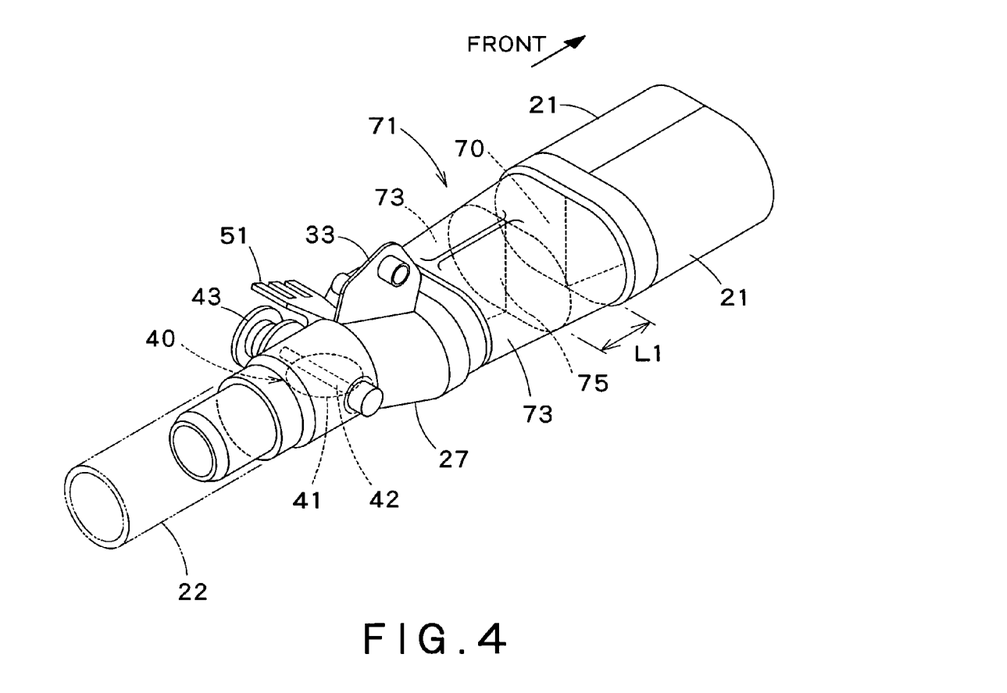
FIG. 4 is a perspective view of a second exhaust aggregating member and an intermediate connecting unit included in an exhaust system in a second embodiment according to the present invention.

The intermediate connecting unit 71 defines two parallel exhaust passages 73 separated by a partition wall 75. The partition wall 75 extends upstream from the downstream end of the intermediate connecting unit 71 so as to form a connecting hole 70 of a length L1 connecting the two exhaust passages 73.

Figure 5:
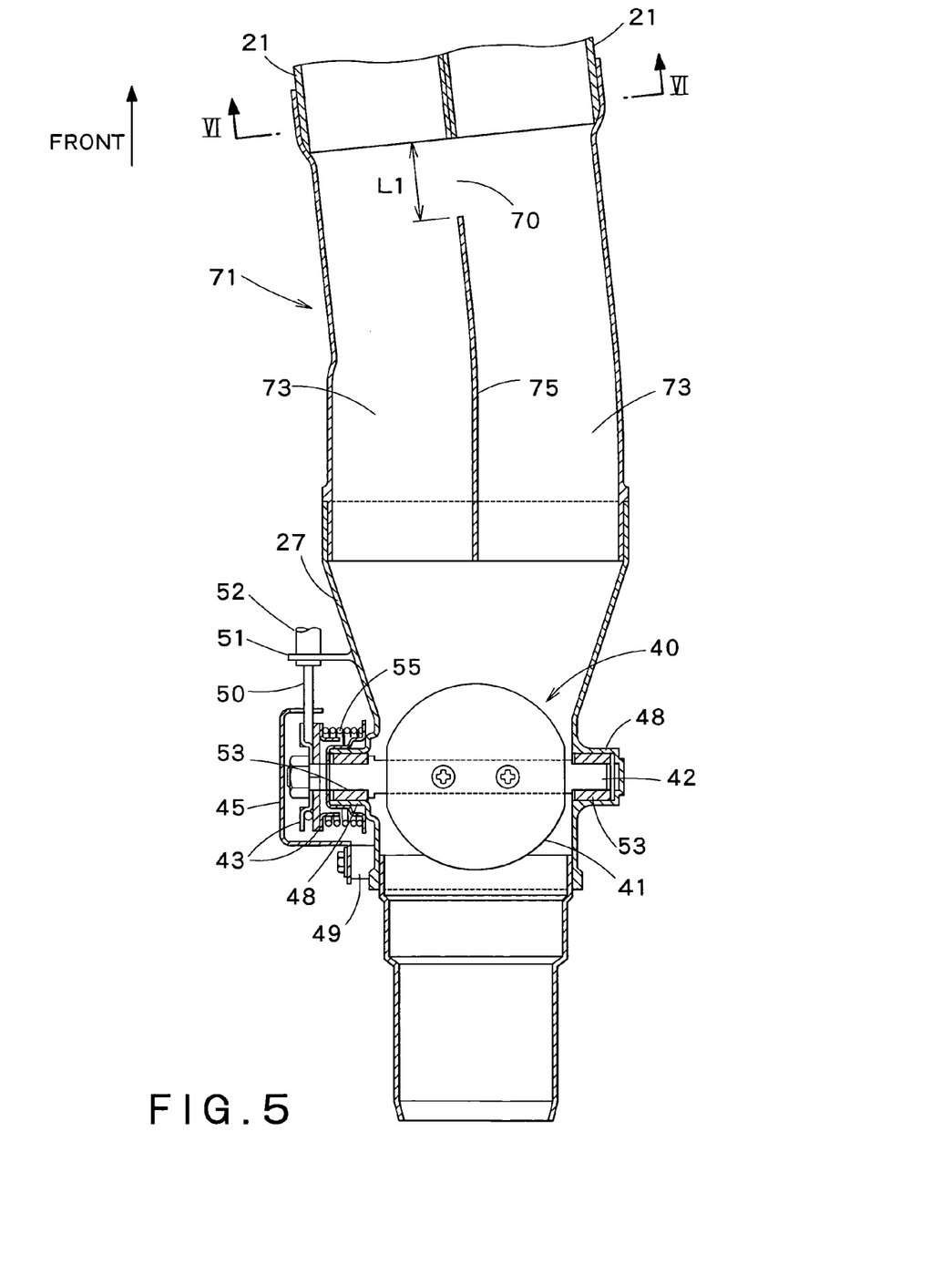
FIG. 5 is an enlarged, horizontal sectional view of the second exhaust aggregating member including the intermediate connecting unit shown in FIG. 4.
Figure 6:
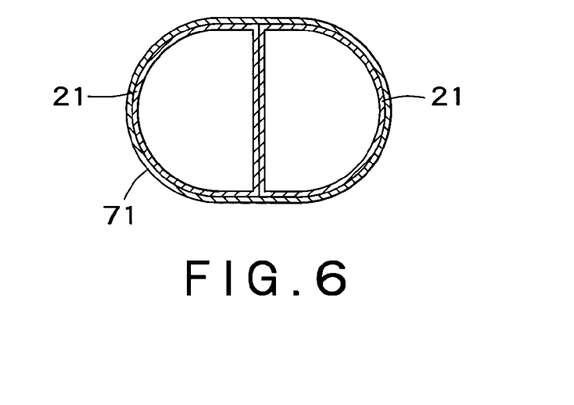
FIG. 6 is a sectional view taken on the line VI-VI in FIG. 5.

FIG. 5 is an enlarged, horizontal sectional view of the second exhaust aggregating member 27 shown in FIG. 4. The connecting hole 70 is formed in an upstream end part of the intermediate connecting unit 71. Downstream end parts of the two intermediate exhaust pipes 21 are joined together to form a connecting part having an oblong cross-sectional shape as shown in FIG. 6. The connecting part is fitted in an upstream end part having an oblong cross-sectional shape of the intermediate connecting unit 71.

Referring to FIG. 5, exhaust gas streams passed through the two intermediate exhaust pipes 21 join together through the opening 70 formed at the upstream end of the intermediate connecting unit 71. Consequently, the pressures and flow rates of the exhaust gas streams in the two intermediate exhaust pipes 21 are equalized, and the equalized exhaust gas streams flow through the two exhaust passages 73 and join smoothly together in the second exhaust aggregating member 27 without being disturbed. The connecting hole 70 enables the effective use of exhaust gas pulsation for the improvement of the torque characteristic of the engine. For example, the depth of a valley in a torque curve can be reduced.

Figure 7:
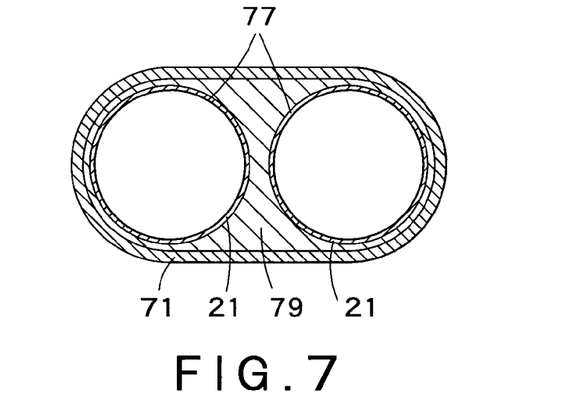
FIG. 7 is a sectional view of a modification of an intermediate exhaust pipe included in the exhaust system in the second embodiment corresponding to a part shown in FIG. 6.

FIG. 7 is a sectional view, corresponding to FIG. 6, of intermediate exhaust pipes 21 in a modification of the intermediate exhaust pipes 21 of the second embodiment. As shown in FIG. 7, the downstream end part of each of the two intermediate exhaust pipes 21 maintains its substantially circular shape and is fitted in each of two round holes 77 formed in an adapter 79. The two intermediate exhaust pipes 21 are connected to the oblong end part of the intermediate connecting unit 71 by means of the adapter 79.

The adapter 79 has an oblong cross-sectional shape and is fitted in the upstream end having an oblong cross-sectional shape of the intermediate connecting unit 71.

The exhaust system in the second embodiment, comparing to the exhaust system of a related art having the two exhaust pipes connected by the circular connecting pipe as mentioned above, is compact and needs less space.

The present invention is applicable also to a motorcycle provided with a six-cylinder engine or an eight-cylinder engine. In the exhaust system for such a motorcycle, an exhaust control valve is incorporated into an exhaust aggregating member positioned at the most downstream side and connecting two exhaust pipes to a single exhaust pipe connected to a muffler.

The exhaust control valve may be, instead of the butterfly valve shown in FIG. 3, any valve permitting the adjustment of its opening degree, such as a shutter-type valve or a cylindrical valve. An actuator for operating the exhaust control valve may be, instead of the stepping motor 57 shown in FIG. 2, a cylinder actuator or a linear motor.

The above-mentioned intermediate connecting unit having the connecting hole may be interposed in the middle of two parallel exhaust pipes which are connected to separate mufflers, respectively, so that the equalization of exhaust pressures in the two exhaust pipes is performed.

The cast second exhaust aggregating member may be replaced with an exhaust aggregating member formed by processing plates or pipes.

Although the invention has been described in its preferred embodiments with a certain degree of particularity, obviously many changes and variations are possible therein. It is therefore to be understood that the present invention may be practiced otherwise than as specifically described herein without departing from the scope and spirit thereof.

What is claimed is:

1. An exhaust system for a motorcycle provided with a multicylinder engine, comprising:
   an exhaust aggregating member for unifying a pair of exhaust passages so as to form a single exhaust passage in the exhaust aggregating member, an exhaust gas exhausted from the engine capable of being transported through the exhaust aggregating member to a muffler, the single exhaust passage being connected to the muffler without being merged with another exhaust passage;
   an exhaust control valve incorporated into the exhaust aggregating member and capable of changing a sectional area of the single exhaust passage formed in the exhaust aggregating member; and
   a common partition wall disposed at an upstream side with respect to the exhaust aggregating member so as to separate the pair of exhaust passages from each other, a connecting hole being formed through the common partition wall at a position apart from a downstream end of the common partition wall so that the pair of exhaust passages communicate with each other through the connecting hole.

2. The exhaust system according to claim 1, further comprising:
   a pair of exhaust pipes defining the pair of exhaust passages; and an intermediate connecting unit connecting the pair of exhaust pipes and the exhaust aggregating member, the intermediate connecting unit being provided with the common partition wall therein.

3. The exhaust system according to claim 2, wherein the connecting hole is positioned at an upstream end of the intermediate connecting unit.

4. An exhaust system for a motorcycle provided with a multicylinder engine, comprising:
   a plurality of upstream-side exhaust pipes disposed upstream with respect to a flowing direction of an exhaust from the engine;
   a single downstream-side exhaust pipe disposed downstream with respect to the flowing direction;
   an exhaust aggregating pipe disposed between the upstream-side exhaust pipes and the downstream-side exhaust pipe, the exhaust aggregating pipe being separately formed from the downstream-side exhaust pipe and connected to the downstream-side exhaust pipe, the exhaust aggregating pipe being tapered in the flowing direction so that the exhaust aggregating pipe has a smaller diameter as its downstream portion than a diameter at its upstream portion; and
   an exhaust control valve incorporated into the exhaust aggregating pipe at the downstream portion of the exhaust aggregating pipe.

5. The exhaust system according to claim 4, wherein the upstream-side exhaust pipes are arranged side-by-side in a transverse direction which is transverse to an axial direction of the upstream-side exhaust pipes, the exhaust aggregating pipe connecting the upstream-side exhaust pipes with the downstream-side exhaust pipe.

6. The exhaust system according to claim 4, wherein each of the upstream-side and downstream-side exhaust pipes has a substantially same diameter along its entire length.

7. The exhaust system according to claim 4, wherein the exhaust aggregating pipe is detachably connected to the downstream-side exhaust pipe.

8. The exhaust system according to claim 4, wherein the exhaust control valve is located at a position where exhausts flowing out from the upstream-side exhaust pipes join each other.

9. The exhaust system according to claim 4, wherein the upstream-side exhaust pipes are arranged side-by-side in a transverse direction which is transverse to an axial direction of the upstream-side exhaust pipes, and
   wherein the exhaust control valve includes a protruding portion which protrudes outside from an other surface of the exhaust aggregating pipe in the transverse direction.

10. The exhaust system according to claim 4, wherein the exhaust control valve includes a protruding portion which protrudes outside from an outer surface of the exhaust aggregating pipe at the downstream portion.

11. The exhaust system according to claim 8, wherein the exhaust control valve comprises a butterfly valve having a disk-shaped valve element, the disk-shaped valve element having a rotational axis which is located at a position where exhausts flowing out from the upstream-side exhaust pipes join each other.

12. The exhaust system according to claim 4, wherein the upstream-side exhaust pipes are arranged side-by-side in a transverse direction which is transverse to an axial direction of the upstream-side exhaust pipes, and
   wherein the exhaust control valve comprises a butterfly valve having a disk-shaped valve element, the disk-shaped valve element having a rotational axis which is extending in the transverse direction.

13. The exhaust system according to claim 4, wherein the exhaust aggregating pipe is integrally provided with a supporting part which is configured to support the exhaust control valve which is integrated into the exhaust aggregating pipe.

14. The exhaust system according to claim 13, wherein the upstream-side exhaust pipes are arranged side-by-side in a transverse direction which is transverse to an axial direction of the upstream-side exhaust pipes, and
wherein the supporting part is protruding from an other surface of the exhaust aggregating pipe in the transverse direction.

15. The exhaust system according to claim 4, further comprising an intermediate connecting pipe which is disposed between the upstream-side exhaust pipe and the exhaust aggregating pipe so as to connect the upstream-side exhaust pipe with the exhaust aggregating pipe, the intermediate connecting pipe including a common partition wall which is extending in the flowing direction of the exhaust so as to form a pair of exhaust passages in the intermediate connecting pipe, a connecting hole being formed through the common partition wall at an upstream portion of the common partition wall.

* * * * *